US008905846B2

(12) United States Patent
Laufgraben

(10) Patent No.: US 8,905,846 B2
(45) Date of Patent: Dec. 9, 2014

(54) SYSTEMS AND METHODS FOR ELECTRONIC DISCOVERY

(76) Inventor: Eric Laufgraben, New York, NY (US)

( * ) Notice: Subject to any disclaimer, the term of this patent is extended or adjusted under 35 U.S.C. 154(b) by 256 days.

(21) Appl. No.: 13/533,854

(22) Filed: Jun. 26, 2012

(65) Prior Publication Data

US 2013/0021238 A1    Jan. 24, 2013

Related U.S. Application Data

(63) Continuation of application No. 12/605,728, filed on Oct. 26, 2009, now Pat. No. 8,226,482.

(51) Int. Cl.
| | | |
|---|---|---|
| *G06F 17/00* | (2006.01) | |
| *G06F 3/0489* | (2013.01) | |
| *G06F 3/038* | (2013.01) | |
| *G06F 3/02* | (2006.01) | |
| *G06F 3/0338* | (2013.01) | |
| *G06F 3/0484* | (2013.01) | |

(52) U.S. Cl.
CPC .......... *G06F 3/0338* (2013.01); *G06F 3/04892* (2013.01); *G06F 2203/0384* (2013.01); *G09G 2370/24* (2013.01); *G06F 3/038* (2013.01); *G06F 3/02* (2013.01); *G06F 3/04847* (2013.01); *A63F 2300/1018* (2013.01)
USPC .......................................................... 463/37

(58) Field of Classification Search
CPC .................................................. A63F 2300/10
USPC ................. 463/37–40, 42; 345/156, 161, 173
See application file for complete search history.

(56) References Cited

U.S. PATENT DOCUMENTS

| | | | |
|---|---|---|---|
| 5,796,354 A | 8/1998 | Cartabiano et al. | |
| 5,878,248 A | 3/1999 | Tehranian et al. | |
| 6,075,522 A | 6/2000 | Milroy | |
| 6,084,570 A | 7/2000 | Milroy | |
| 6,392,633 B1 | 5/2002 | Leiper | |
| 6,965,904 B2 | 11/2005 | Bankert et al. | |
| 7,051,291 B2 | 5/2006 | Sciammarella et al. | |
| 7,207,885 B2 | 4/2007 | Longman | |
| 7,407,439 B1 | 8/2008 | Ochoa | |
| 7,439,958 B2 | 10/2008 | Yoon | |
| 7,536,635 B2 | 5/2009 | Racovolis et al. | |
| 8,226,482 B2 | 7/2012 | Laufgraben | |
| 2002/0070915 A1 | 6/2002 | Mazza et al. | |
| 2003/0139213 A1* | 7/2003 | Sobota | 463/37 |
| 2005/0197178 A1 | 9/2005 | Villegas | |

(Continued)

OTHER PUBLICATIONS

Buxton, W., "Two-Handed Document Navigation," [retrieved on Jun. 17, 2009]. Retrieved from the Internet <URL: http://www.billbuxton.com/2Hnavigation.html>.

(Continued)

*Primary Examiner* — Ronald Laneau
(74) *Attorney, Agent, or Firm* — Jones Robb, PLLC

(57) ABSTRACT

A system for electronic discovery may comprise an electronic discovery platform; a two-handed controller configured to produce a plurality of signals; and a memory configured to store at least one set of controller signal relationships, the controller signal relationships being associated with the two-handed controller. A system for electronic discovery may further comprise an interface application communicatively coupled to the memory, wherein the interface application uses the at least one set of controller signal relationships to associate at least one of the plurality of signals from the two-handed controller with at least one of a plurality of discovery commands associated with the discovery of electronic data, and wherein the interface application communicates a determined discovery command such that the discovery command is executed by the electronic discovery platform.

17 Claims, 6 Drawing Sheets

(56) References Cited

U.S. PATENT DOCUMENTS

| | | |
|---|---|---|
| 2008/0133551 A1 | 6/2008 | Wensley et al. |
| 2008/0266143 A1 | 10/2008 | Ohshita |
| 2009/0055413 A1 | 2/2009 | Audet |
| 2009/0295714 A1* | 12/2009 | Erickson ........................ 345/156 |
| 2009/0298590 A1* | 12/2009 | Marks et al. ..................... 463/37 |
| 2011/0098115 A1 | 4/2011 | Laufgraben |
| 2011/0172015 A1 | 7/2011 | Ikeda et al. |
| 2013/0127726 A1* | 5/2013 | Song et al. ..................... 345/168 |

OTHER PUBLICATIONS

Sandnes F. and Aubert, A., "Bimanual text entry using game controllers: Relying on users' spatial familiarity with QWERTY." [retrieved on Jun. 17, 2009], Retrieved from the Internet <URL: http://portal.acm.org/citation.cfm?id=1224831>.

Sun, L., "Flipper: a New Method of Digital Document Navigation," [retrieved on Jun. 17, 2009], Retrieved from the Internet: <URL: http://www.cs.cornell.edu/~francois/Papers/Flipper.pdf>.

Zhai, S. and Smith, B., "Multistream input: an experimental study of document scrolling methods," [retrieved on Jun. 17, 2009]. Retrieved from the Internet: <URL: http://portal.acm.org/citation.cfm?id=339378>.

Office Action from patented U.S. Appl. No. 12/605,728 dated Nov. 3, 2011.

Response to Office Action from patented U.S. Appl. No. 12/605,728 dated Feb. 3, 2012.

* cited by examiner

| CONTROLLER BUTTON, JOYSTICK, OR ARROW KEY | DISCOVERY COMMAND | MOUSE/KEYBOARD FUNCTION |
|---|---|---|
| L-1 (LEFT INDEX FINGER) | PREVIOUS DOCUMENT | UP ARROW |
| L-2 (LEFT MIDDLE FINGER) | PREVIOUS PAGE WITHIN DOCUMENT | PAGE UP |
| R-1 (RIGHT INDEX FINGER) | NEXT DOCUMENT | DOWN ARROW |
| R-2 (RIGHT MIDDLE FINGER) | NEXT PAGE WITHIN DOCUMENT | PAGE DOWN |
| L-3 (LEFT THUMB) | TO NAVIGATE CURSOR (X, Y AXIS) AND PRESS TO "CLICK" | LEFT CLICK |
| R-3 (RIGHT THUMB) | TO NAVIGATE CURSOR (X, Y AXIS) AND PRESS TO "CLICK" | LEFT CLICK |
| ARROW KEYS 1 - 4 | TO NAVIGATE CURSOR ALONG X, Y AXIS | SCROLL |
| BUTTON A (SELECT) | NAVIGATE FROM ONE PANEL TO ANOTHER | TAB |
| BUTTON B (START) | SHORTCUT TO OPEN DISCOVERY SOFTWARE | CTRL + O |
| BUTTON C (PRINT) | OPENS PRINT DIALOG BOX | CTRL + P |
| BUTTON D (SEARCH) | OPENS SEARCH BOX | CTRL + S |
| BUTTON E (SELECT ALL) | SELECTS ALL DOCUMENTS IN A QUERY | CTRL + A |
| BUTTON F (REDACT) | OPENS REDACT FEATURE | RIGHT CLICK + CHOOSE REDACT |
| BUTTON G (MENU) | OPENS MENU WITHIN SOFTWARE | RIGHT CLICK |

FIG. 5

SYSTEMS AND METHODS FOR ELECTRONIC DISCOVERY

RELATED APPLICATION

This application is a continuation of U.S. patent application Ser. No. 12/605,728 (filed Oct. 26, 2009; now U.S. Pat. No. 8,226,482 B2), the entirety of which is incorporated herein by reference.

TECHNICAL FIELD

The present teachings relate to systems and methods for electronic discovery. More particularly, the present teachings relate to systems and methods for electronic discovery using a two-handed controller.

BACKGROUND

The nature of digital data makes it well-suited to investigation. Digital data, for example, can be electronically searched with relative ease as compared to paper documents, for example, which must be scrutinized manually. Digital data is also difficult to completely destroy, particularly once it is saved onto a computer network. Electronic discovery, ("e-discovery"), refers to any process in which digital or electronic data is sought, located, secured, searched, reviewed and/or produced. E-discovery, for example, is often conducted with the intent of using digital or electronic data as evidence in a civil or criminal legal case. E-discovery is also used in other contexts, including, for example, conducting an internal investigation; creating a virtual data room in support of the due diligence process in a merger, acquisition or other transaction; internal case management; and responding to a subpoena.

In the process of electronic discovery, electronic and digital data files of all types can be collected, located, secured, searched, reviewed and/or produced. This can include, for example, text (i.e., e-mail, instant messaging chats and word-processing documents (e.g., Word® documents)), images, calendar files, databases, spreadsheets, audio files, animation files, Web-sites and/or computer programs. Even malware such as viruses, Trojans and spyware can be secured and investigated. With the increasing use of electronic devices for creating, storing and transferring data, however, the retrieval and analysis of useful and valuable electronic information can pose challenges. Consequently, various electronic discovery service providers and software platforms have been developed to help support the electronic discovery process and assist lawyers, paralegals and other legal professionals ("reviewers") with the effective retrieval and review of relevant digital data.

Electronic discovery software tools can, for example, categorize, search and/or sort for data in a variety of formats. Reports can be generated within minutes and documents can be viewed, tagged and/or redacted. During the discovery process, documents and other electronic data are generally loaded and maintained on a central database, for example, while electronic discovery software is loaded onto various terminals, workstations, or other computers, where reviewers may access and review the electronic data, utilizing the software's various tools. Each computer, for example, may generally include various input devices, such as, for example, a keyboard and/or mouse, to allow navigation of the electronic discovery software (e.g., to move from electronic data file to electronic data file, to view pages within an electronic file, to redact portions of a an electronic data file, and to "tag" an electronic data file for later identification, retrieval, organization and/or production).

Input devices, such as a keyboard and mouse, which are conventionally used with electronic discovery software, however, can be inefficient and often uncomfortable. Also, some input devices limit reviewers to one-handed operation of the device. Further, such input devices provide limited functionality (i.e., generally being restricted to point-and-click and/or scroll applications). To increase reviewer efficiency and, ultimately, reduce the costs associated with e-discovery, it may therefore be advantageous to provide an input device that allows for two-handed manipulation of the electronic discovery software, affording seamless transition between software applications and more proficient utilization of software tools, while also reducing reviewer temptation to navigate away from the discovery software to the Internet or other computer programs. To further increase reviewer efficiency and/or engagement in the review process, thereby reducing the cost of conducting e-discovery, it may also be advantageous to provide a handheld input device that affords increased functionality and mobility when utilizing various review tools and/or tasks within the discovery software. To increase reviewer comfort throughout a lengthy and often arduous electronic data review process it may be further advantageous to provide an ergonomically designed input device that limits the amount of strain on a reviewer's wrists and hands.

SUMMARY

The present teachings may solve one or more of the above-mentioned problems and/or may demonstrate one or more of the above-mentioned desirable features. Other features and/or advantages may become apparent from the description that follows.

In accordance with various exemplary embodiments, a system for electronic discovery may comprise an electronic discovery platform, a two-handed controller configured to produce a plurality of signals, and a memory configured to store at least one set of controller signal relationships, the controller signal relationships being associated with the two-handed controller. A system for electronic discovery may further comprise an interface application communicatively coupled to the memory, wherein the interface application uses the at least one set of controller signal relationships to associate at least one of the plurality of signals from the two-handed controller with at least one of a plurality of discovery commands associated with the discovery of electronic data, and wherein the interface application communicates a determined discovery command such that the discovery command is executed by the electronic discovery platform.

In accordance with various additional exemplary embodiments, a method for electronic discovery may comprise receiving a signal from a two-handed controller and determining a discovery command associated with the signal from the two-handed controller. A method for electronic discovery may further comprise communicating the determined discovery command to an electronic discovery platform, wherein the electronic discovery platform may execute the discovery command.

Additional objects and advantages will be set forth in part in the description which follows, and in part will be obvious from the description, or may be learned by practice of the present teachings. The objects and advantages may be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The present teachings can be understood from the following detailed description either alone or together with the accompanying drawings. The drawings are included to provide a further understanding, and are incorporated in and constitute a part of this specification. The drawings illustrate one or more exemplary embodiments of the present teachings and together with the description serve to explain various principles and operation.

FIG. 5 is a table that identifies example default controller signal relationships for the controller of FIG. 2 in accordance with an exemplary embodiment of the present teachings;

DESCRIPTION OF EXEMPLARY EMBODIMENTS

As noted above, an input device, such as a mouse, can be inefficient and uncomfortable when used for long periods of time during an electronic discovery process. Such devices, for example, generally limit reviewers to desktop, one-handed navigation, while only providing a very limited amount of point-and-click and scroll functionality, which tends to slow down the e-discovery process and increase costs for the party conducting e-discovery. To increase reviewer efficiency, various exemplary embodiments of the present teachings consider systems and methods for electronic discovery that utilize a two-handed controller, which allows for handheld, two-handed manipulation of the electronic discovery software, thereby facilitating transition between software applications and providing more proficient utilization of software tools. Various exemplary embodiments of the present teachings consider, for example, systems and methods for electronic discovery that utilize a two-handed controller comprising various buttons and/or joysticks that can be assigned to various review tools and/or tasks within the discovery software. Furthermore, to increase reviewer comfort throughout a lengthy and often arduous electronic review process, various exemplary embodiments of the present teachings consider, for example, systems and methods of electronic discovery that utilize an ergonomically designed two-handed controller, such as, for example, a handheld video game controller, configurations of which are generally known to those ordinarily skilled in the art.

As used herein, the term "two-handed controller" refers to a controller that is configured to be supported in the hands during use and can be simultaneously manipulated with both hands. In contrast to input devices, such as a mouse and keyboard, which generally require that the device be supported on a planar surface for proper manipulation and use, a two-handed controller in accordance with the present teachings may afford complete functionality without resting on a surface. Those of ordinary skill in the art will understand, however, that in various embodiments, a two-handed controller can be manipulated with only one hand and/or may rest on a surface during use without departing from the scope of the present teachings. However, the configuration of two-handed controllers in accordance with the present teachings provide for use when supported in a user's hands and manipulability by both hands without sacrificing ease of use.

Figure 1:
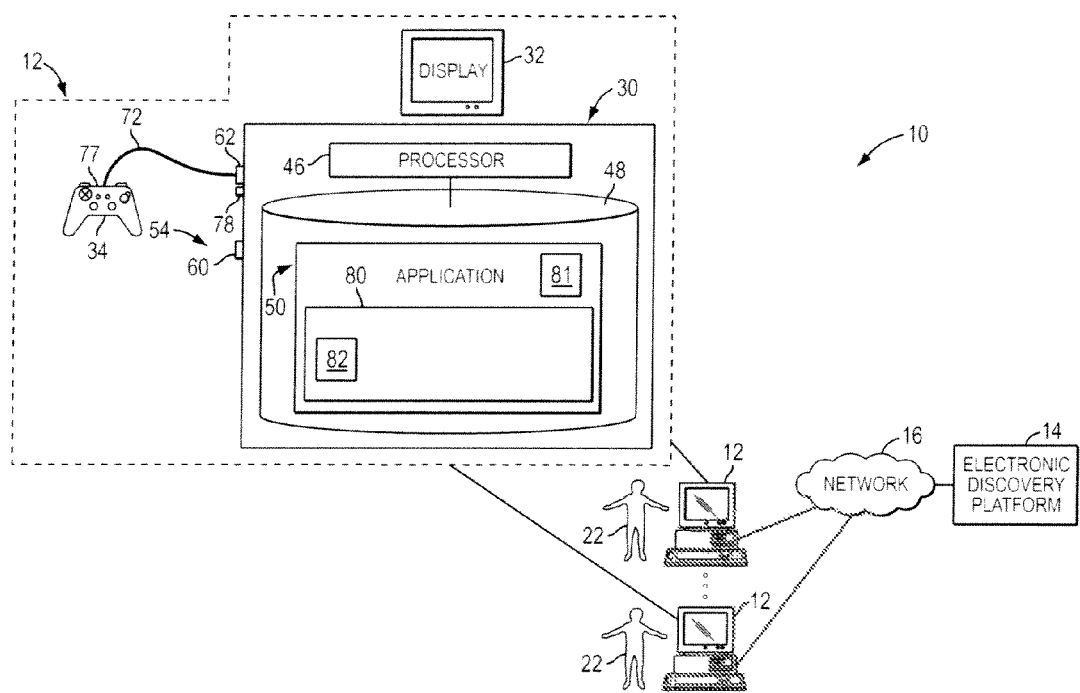
FIG. 1 illustrates an exemplary embodiment of a system for electronic discovery using a two-handed controller in accordance with the present teachings.

FIG. 1 illustrates an exemplary system for electronic discovery 10 using a two-handed controller 34. As shown in FIG. 1, system 10 may include a number of user computer terminals 12 coupled to an electronic discovery platform 14 by a communications network 16. User computer terminals 12 provide users 22 access to engage in discovery activity via discovery platform 14. Those ordinarily skilled in the art will understand that a user 22 may be any entity, such as an individual reviewer (e.g. an attorney, paralegal, or other legal professional), group of individuals or firm, that engages in discovery activity via system 10.

Electronic discovery platform 14 is an electronic discovery architecture, that facilitates the discovery and review of electronic data files, including, but not limited to, text (i.e. e-mail, instant messaging chats and Word® documents), images, calendar files, databases, spreadsheets, audio files, animation files. Web sites and computer programs. Electronic discovery platform 14 may be a computer, a server, a management center, or a headquartering office of any person, business, or entity that provides and/or maintains the electronic discovery software. Accordingly, those ordinarily skilled in the art will understand that electronic discovery platform 14 may include any suitable hardware, software, personnel, devices, components, elements, and/or objects that may be utilized or implemented to achieve the operations and functions of an administration body or supervising entity that manages and/or administers the electronic discovery software and related discovery environment.

The electronic discovery platform 14 may be provided, for example, by any known electronic discovery service provider and/or vendor, including, but not limited to Stratify® provided by Iron Mountain® Inc., Concordance® provided by LexisNexis®, CaseData™ provided by CaseData Inc., and Ontrack® Inview™ provided by Kroll Ontrack®.

Communications network 16 is a communicative platform operable to exchange data or information between electronic discovery platform 14 and terminals 12. In various exemplary embodiments of the present teachings, communications network 16 comprises, for example, an Internet architecture, which provides users 22 with the ability to electronically review documents and execute discovery commands to be delivered to the electronic discovery platform 14. Those of ordinary skill in the art will understand, however, that communications network 16 can be any appropriate architecture or system that facilitates communications in a network environment, such as, for example, any packet data network (PDN), local area network (LAN), metropolitan area network (MAN), wide area network (WAN), wireless local area network (WLAN), virtual private network (VPN) or intranet.

Those of ordinary skill in the art will understand, however, that in various embodiments, the electronic discovery platform 14 may be configured to run locally on terminals 12. Consequently, in various embodiments, a communications network 16 may not be required to exchange data or information between electronic discovery platform 14 and terminals 12.

A user terminal 12 may include a computer system and appropriate software to allow user 22 to engage in electronic discovery activity via electronic discovery platform 14. As used herein, the term "computer" refers to any suitable device operable to accept input, process the input according to predetermined rules, and produce output. A computer may comprise, for example, a personal computer, laptop, work station, network computer, wireless data port, wireless telephone, personal digital assistant (PDA), personal gaming system (e.g., Microsoft Xbox® or Sony PlayStation® game console), one or more processors within and of those devices, or any other suitable processing device.

As shown in FIG. 1, a user terminal 12 may include a terminal body 30, a display device 32 and a two-handed controller 34. User terminal 12 may also include one or more additional input devices, such as, for example, a keyboard and/or a mouse.

The terminal body 30 may include a processor 46 and a memory unit 48 that stores an interface application 50. Processor 46 may process data associated with system 10, which may include, for example, executing coded instructions associated with interface application 50. Memory unit 48 may be coupled to processor 46 and may include one or more databases and/or other suitable memory devices, including, but not limited to, one or more random access memories (RAMs), read-only memories (ROMs), dynamic random access memories (DRAMs), microcontrollers or microprocessors. The terminal body 30 also includes one or more input ports 54, each of which provides an interface for coupling the two-handed controller 34, and/or other peripheral devices to interface application 50. The input ports 54 may include various types of interfaces, including, but not limited to, USB type ports, serial ports, parallel ports. Bluetooth® ports or FireWire® ports. In the exemplary embodiment depicted in FIG. 1, for example, the terminal body 30 includes a serial port 60 and a USB type port 62. Although in the depicted embodiment the two-handed controller 34 is coupled to a USB type port 62 via a USB cable 72, those ordinarily skilled in the art would understand that the two-handed controller 34 may be coupled to various types of input ports, depending on the type of cable and/or plug that is provided by the two-handed controller 34.

Figure 3:
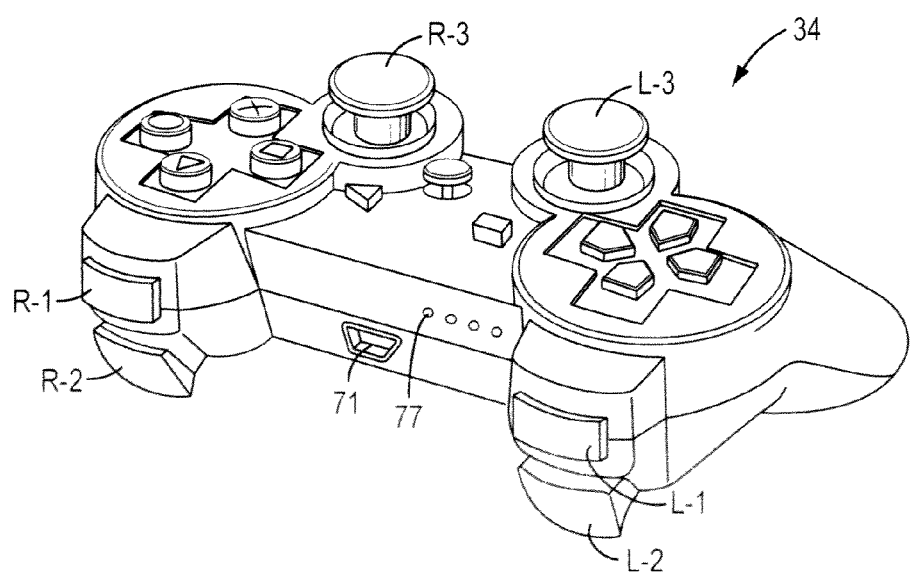
FIG. 3 is a side view of the controller of FIG. 2.

In various additional exemplary embodiments of the present teachings, the two-handed controller 34 may communicate with the interface application 50 at least in part by wireless communications, affording a user 22 with more freedom of movement relative to the terminal body 30. As shown in FIGS. 1 and 3, for example, the two-handed controller 34 may include a wireless transceiver 77 that communicates wirelessly with a wireless transceiver 78 associated with the terminal body 30. Such wireless communications may utilize any suitable wireless communications protocols with which those ordinarily skilled in the art are familiar.

The display device 32 may be any suitable device for displaying information to the user 22, such as, for example, a notebook display, monitor, or a television. Although only a single display device is illustrated in FIG. 1, the system 10 could also include 2 or more display devices 32 to allow for viewing of different screen shots (e.g., documents, etc.) on each display device.

The two-handed controller 34 may be any variety of handheld, two-handed input device, such as, for example, an input device used in connection with video and/or computer gaming, such as, for example, a handheld video game controller, such as a gamepad, joypad and/or control pad, used in connection with a Microsoft Xbox® gaming console or a Sony PlayStation® gaming console. As above, a two-handed controller refers to a controller that is configured to be supported in a user's hands during use and can be simultaneously manipulated with both hands. Accordingly, unlike input devices, such as a mouse and keyboard, which generally require that the device be supported on a planar surface for proper manipulation and use, a two-handed controller in accordance with the present teachings may afford complete functionality without resting on a surface. Those of ordinary skill in the art will understand, however, that in various embodiments, a two-handed controller can be manipulated with only one hand and/or may rest on a surface during use without departing from the scope of the present teachings.

Figure 2:
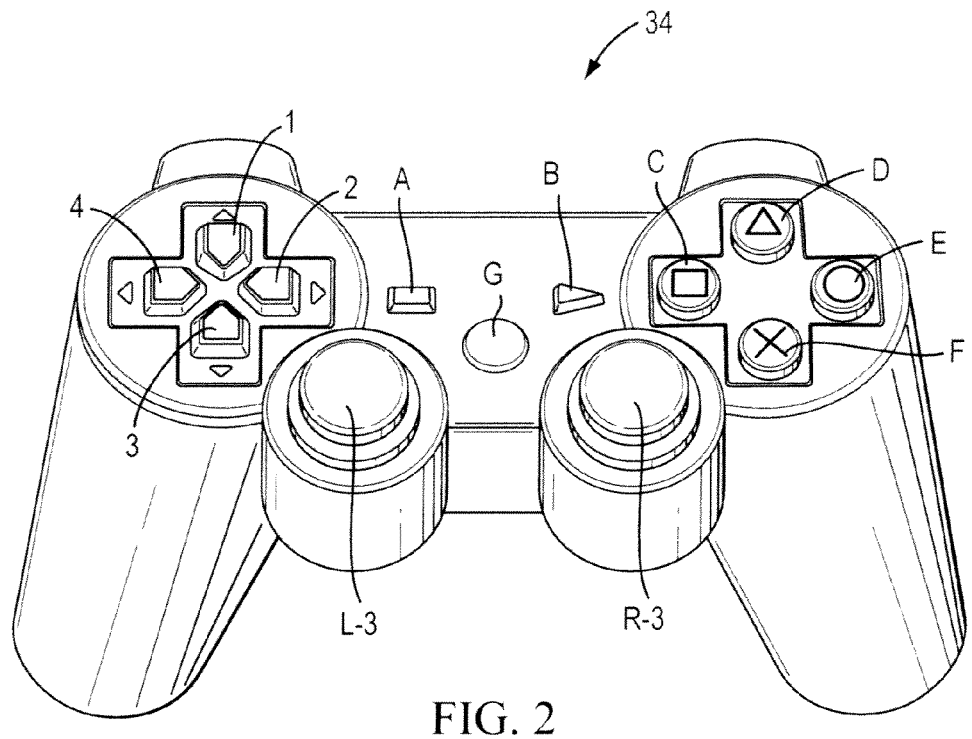
FIG. 2 is a top perspective view of an exemplary embodiment of a two-handed controller for use with the system of FIG. 1.

As illustrated in FIGS. 2 and 3, in various exemplary embodiments of the present teachings, the two-handed controller 34 may include at least one button, at least one joystick and/or at least one arrow key. The depression and/or manipulation of such buttons, joysticks and/or arrow keys by a user 22 may generate a plurality of signals, which may be received and interpreted by interface application 50 in order to generate commands related to the functions of electronic discovery system 10.

Interface application 50 includes one or more applications and modules that provide interfaces that allow user 22 to communicate with electronic discovery platform 14 using the two-handed controller 34 and the display device 32. As would be understood by those of ordinary skill in the art, such applications and modules may include, for example, graphical user interface (GUI) applications that generate displays of information on the display device 32; receive and interpret commands from the two-handed controller 34 in order to cause changes to the active display on the display device 32 and to generate and send messages to the electronic discovery platform 14; and receive and interpret messages from the electronic discovery platform 14 in order to cause changes to the active display on the display device 32.

The interface application 50 may include any suitable software or coded instructions for providing at least the various functionalities discussed herein with reference to the interface application 50 and the two-handed controller 34. Various exemplary embodiments of the present teachings, for example, contemplate utilizing interface software, such as, for example, ControlMK® a freeware program developed by programmer Redcl0ud, which may allow the two-handed controller 34 to emulate the functionality of a traditional mouse and/or keyboard.

As shown in FIG. 1, for example, the interface application may include a mapping module 80 and a configuration module 81. The mapping module 80 may define various relationships for mapping signals received from the two-handed controller 34 with various commands associated with the discovery of electronic data. The mapping module 80 may include, for example, controller signal relationships 82, which associate a signal generated by the two-handed controller 32 with a discovery command associated with the system 10.

In various exemplary embodiments of the present teachings, the mapping module 80 may include sets of controller signal relationships 82 for various types and/or models of two-handed controllers 34 for use in conjunction with various electronic discovery platforms 14. Accordingly, if more than one type and/or model of two-handed controller 34 is used with a particular user terminal 12, or more than one electronic discovery platform 14 is accessed from a particular user terminal 12, controller signal relationships 82 specific to each type and/or model of two-handed controller 34 and/or electronic discovery platform 14 may be stored and retrieved from the mapping module 80. Furthermore, in various exemplary embodiments, each type and/or model of two-handed controller 34 and/or electronic discovery platform 14 may have a default configuration of controller signal relationships 82 maintained by the mapping module 80.

The configuration module 81 cooperates with the mapping module 80 to allow users 22 to configure and/or reconfigure various controller signal relationships 82. In various exemplary embodiments of the present teachings, for example, the configuration module 81 allows a user 22 to configure a set of controller signal relationships 82 associated with an unconfigured two-handed controller 34, as well as to reconfigure the set of controller signal relationships 82 associated with a previously configured two-handed controller 34 for use with a different electronic discovery platform 14. In various exemplary embodiments of the present teachings, the controller signal relationships 82 associated with a two-handed controller 34 may be reconfigured any number of times to be used in conjunction with any number of electronic discovery platforms 14.

The mapping module 80 and the configuration module 81 may include all or portions of the software or coded instructions associated with the interface application 50. The mapping module 80 and the configuration module 81 may also be partially or completely integrated. In addition, multiple instances of the mapping module 80 and/or the configuration module 81 may be provided by the interface application 50.

FIGS. 2 and 3 illustrate one exemplary embodiment of a two-handed controller 34 for use with the electronic discovery system 10 of FIG. 1, with FIG. 2 showing a front perspective view and FIG. 3 a back, side perspective view. As shown in FIGS. 2 and 3, the two-handed controller 34 includes buttons L-1, L-2, R-1, R-2, A, B, C, D, E, F and G, joysticks L-3 and R-3, and arrow keys 1, 2, 3 and 4. The two-handed controller 34 is configured to be held in the hands of a user with L-1, L-2, L-3, 1, 2, 3, 4, and A being manipulated by the left hand and R-1, R-2, R-3, B, C, D, E, and F being manipulated by the right hand. Button G may be manipulated by either hand. In various embodiments, the two-handed controller 34 may also rest on a surface or in a user's lap when in use.

Figure 4:
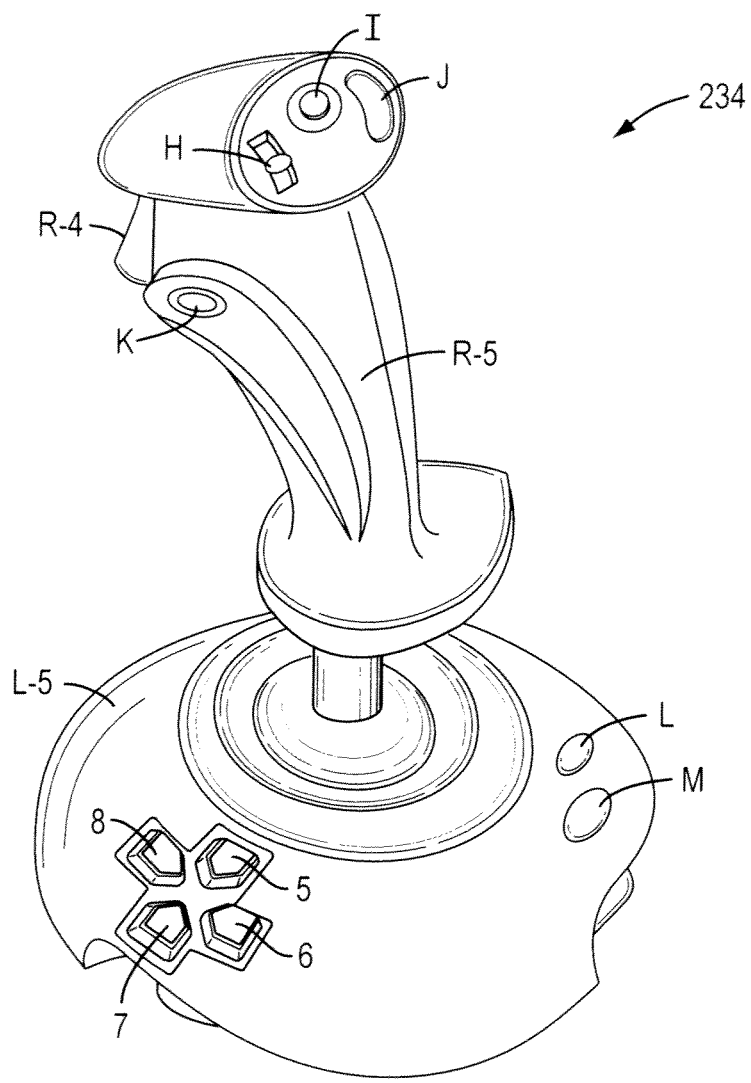
FIG. 4 is a perspective view of an additional exemplary embodiment of a two-handed controller for use with the system of FIG. 1.

FIG. 4 illustrates an additional exemplary embodiment of a two-handed controller 234 for use with the electronic discovery system 10 of FIG. 1. As shown in FIG. 4, the two-handed controller 234 includes a base L-5, buttons R-4, H, I, J, K, L and M, joystick R-5, and arrow keys 5, 6, 7 and 8. In an exemplary method, base L-5 is configured to be held and manipulated, for example, by one hand along with arrow keys 5, 6, 7 and 8, while the other hand manipulates joystick R-5 and the remaining buttons and switches of the two-handed controller 234. In various exemplary embodiments, however, base L-5 may rest on a surface, such as, for example, a desktop surface.

FIG. 5 is a table that specifies exemplary default controller signal relationships 82 for the two-handed controller 34 of FIGS. 2 and 3 in accordance with one exemplary embodiment of the present teachings. As shown in FIG. 5, each controller signal relationship 82 is a relationship between the signal(s) produced by the manipulation of one or more controller buttons, joysticks and/or arrow keys and a discovery command. Using such controller signal relationships 82, during the discovery process a user 22 may navigate, for example, between files or documents within collected electronic data using buttons L-1 (i.e., with the left index finger) and R-1 (i.e., with the right index finger). And a user may further navigate between pages within, for example, a file or document using buttons L-2 (i.e., with the left middle finger) and R-2 (i.e., with the right middle finger). A user 22 may additionally navigate a cursor along an X, Y axis to select various functions that are provided by the discovery platform 14 using joysticks L-3 (i.e., with the left thumb) and R-3 (i.e., with the right thumb) and/or arrow keys 1, 2, 3 and 4. And a user may further select or "click" an operation by depressing joystick L-3 and/or joystick R-3. A user 22 may further navigate between open panels (e.g., between a search menu panel, a search results panel, and a document image panel) and/or windows within the discovery software using button A; open the discovery software using button B; open a print dialog box within the discovery software to print, for example, a file or document (e.g., a collected document, a redacted document, and/or a discovery report) using button C; open a search box to run a query within the discovery software using button D; select all files or documents within a query result (e.g., for review, tagging and/or redaction) using button E; open a redact feature to redact (e.g., blank out) selected portions within selected files or documents using button F; and open a menu within the discovery software using button G.

As also shown in FIG. 5, various exemplary embodiments of the present teachings further contemplate controller signal relationships 82 for the two-handed controller 34 that can replace the basic functionality of a mouse and/or keyboard. As would be understood by those of ordinary skill in the art, FIG. 5 represents only an exemplary list of possible default controller signal relationships and corresponding replaced mouse/keyboard functionality. Various additional embodiments contemplate, for example, that the navigation function can be replaced by manipulation of joystick L-3 (i.e., with the left thumb) and/or joystick R-3 (i.e., with the right thumb), a drag function can be replaced by selecting with joystick L-3 and dragging with joystick R-3, the right click function can be replaced by pressing joystick R-3 twice in succession, and the double right click function can be replaced by pressing joystick R-3 three times in succession. As would be further understood by those of ordinary skill in the art, the various buttons and/or joysticks of the two-handed controller 34 can be assigned to any number of additional discovery functions, such as, for example, the copy, paste, and/or cut functions, without departing from the scope of the present teachings.

As shown in FIG. 3, the two-handed controller 34 also includes both a port 71 (i.e., for connection via USB cable 72) and a wireless transceiver 77 for communication with the terminal body 30. Other ports and/or transceivers configured to provide connection and/or communication between the controller 34 and a computer or other electronic componentry may also be provided in addition to or in lieu of port 71 and transceiver 77.

Figure 6:
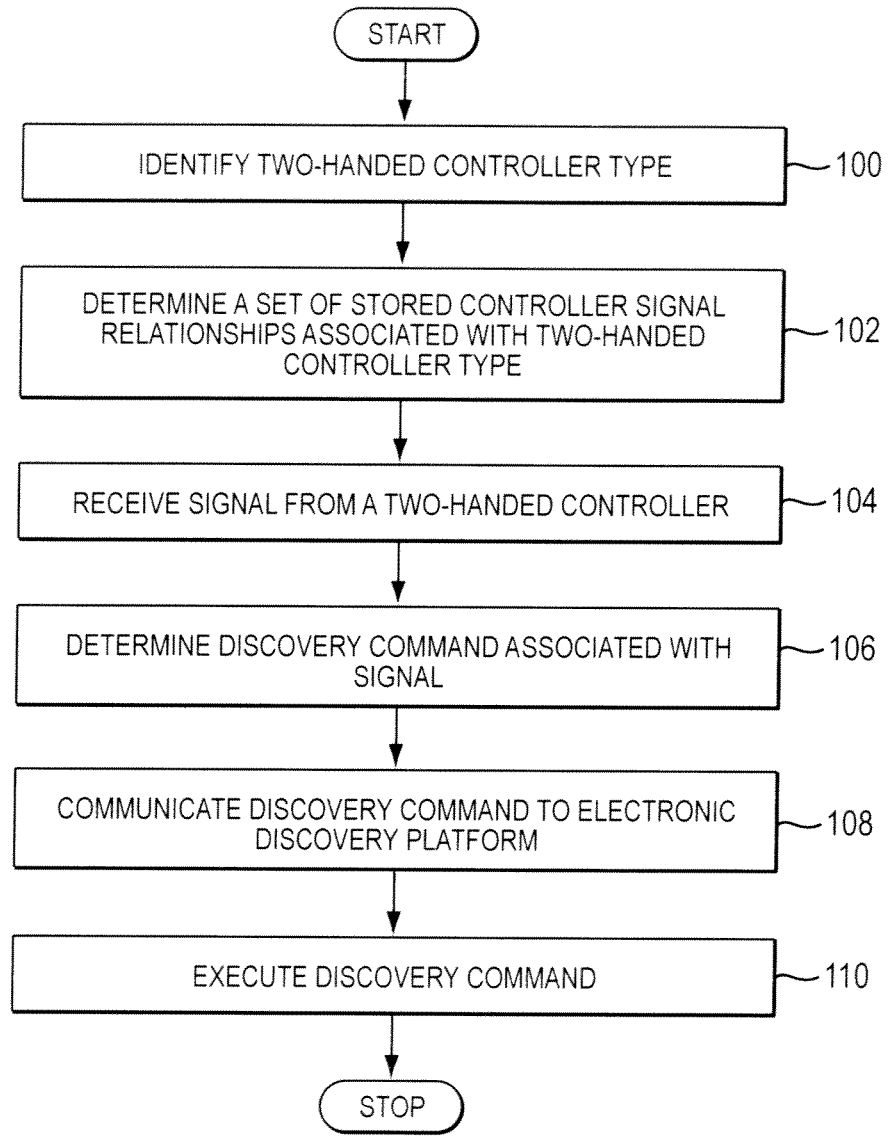
FIG. 6 illustrates exemplary steps of a method of performing electronic discovery using the controller of FIG. 2 and configured according to FIG. 5.

FIG. 6 illustrates an exemplary method of a user engaging in electronic discovery via an exemplary electronic discovery software platform 14 using the two-handed controller 34 shown in FIGS. 2 and 3 configured as described above according to the exemplary embodiment of FIG. 5, and in conjunction with the system 10 of FIG. 1.

At step 100, the type of two-handed controller 34 is identified, for example, via interface application 50. As would be understood by those of ordinary skill in the art, this may involve any suitable steps and/or processes. In various embodiments, for example, interface application 50 may automatically identify the type and/or model of two-handed controller 34 based on signals and/or messages received from the two-handed controller 34. In various additional embodiments, a user 22 may identify the type and/or model of two-handed controller 34 using a GUI displayed to the user 22 by the interface application 50, such as by selecting the appropriate type and/or model of two-handed controller 34 from a list of different two-handed controller types and/or models.

At step 102, the mapping module 80 determines the appropriate set of stored controller signal relationships 82 associated with the two-handed controller 34 type. The controller signal relationships 82 may include, for example, the set of relationships shown in FIG. 6, which are specific to the type and/or model of the two-handed controller 34.

At step 104, interface application 50 receives a signal from the two-handed controller 34. In various embodiments, for example, user 22 may initiate the signal by moving and/or depressing one or more buttons, joysticks and/or arrow keys on the two-handed controller 34. The signal is communicated from the two-handed controller 34 to the interface application 50 via USB port 62. At step 106, interface application 50 determines the discovery command associated with the received signal using the appropriate controller signal relationships 82 identified at step 102. At step 108, interface application 50 communicates the discovery command to the electronic discovery platform 14, and the electronic discovery platform 14 executes the discovery command at step 110.

Figure 7:
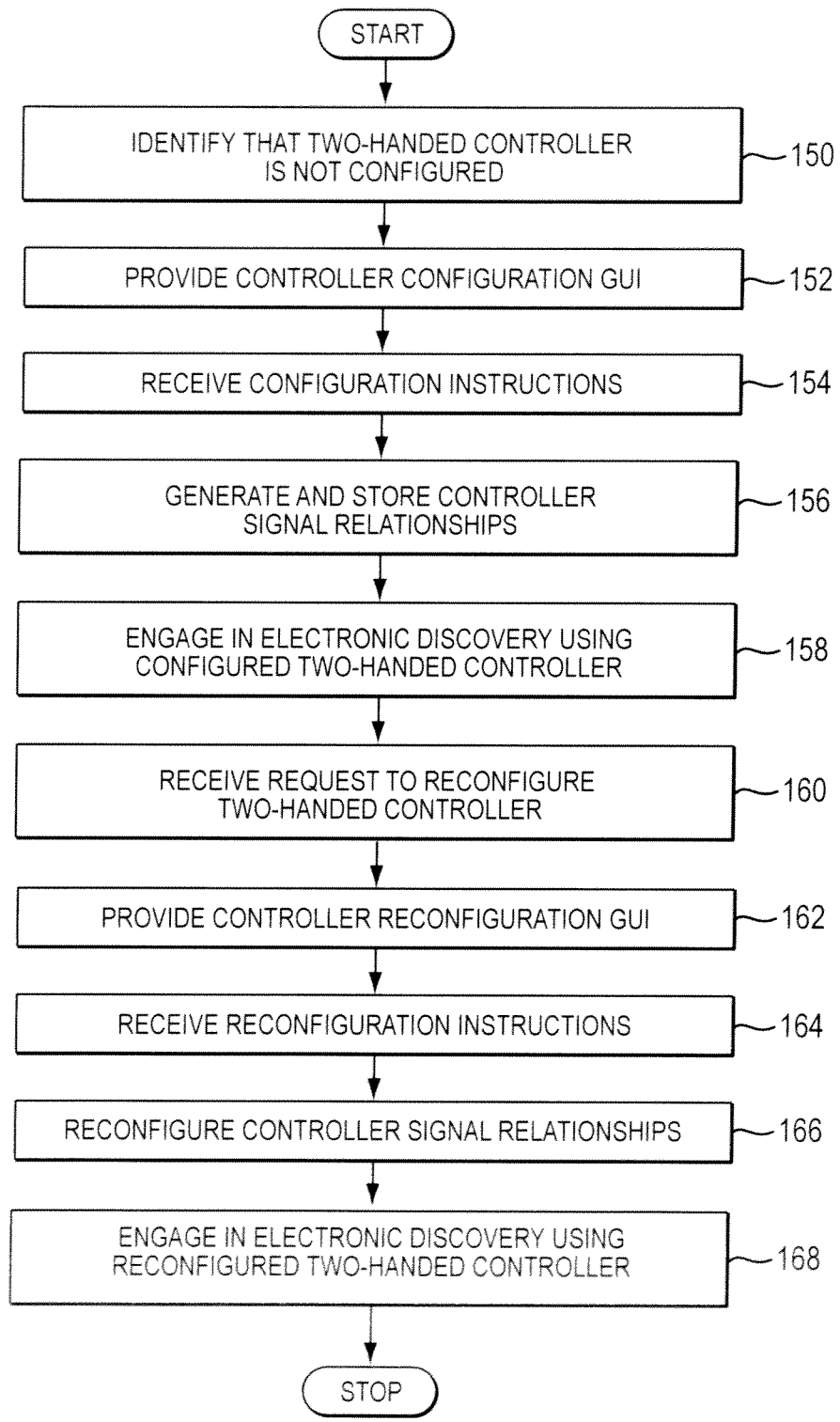
FIG. 7 illustrates exemplary steps of a method of configuring and reconfiguring the controller signal relationships associated with a two-handed controller in accordance with exemplary embodiments of the present teachings.

FIG. 7 illustrates an exemplary method of configuring and reconfiguring the controller signal relationships 82 associated with the two-handed controller 34 in accordance with exemplary embodiments of the present teachings. At step 150, interface application 50 identifies that the two-handed controller 34 that is connected to terminal body 30 is not configured. Accordingly, at step 152, configuration module 81 of the interface application 50 provides a controller configuration GUI on the display device 32, which allows a user 22 to configure, or generate, a set of controller signal relationships 82 for the unconfigured two-handed controller 34.

At step 154, the user 22 may generate and/or communicate configuration instructions to the configuration module 81 via the controller configuration GUI, such as by making selections using the two-handed controller 34 or another input device, such as, for example, a mouse and/or keyboard. At step 156, the configuration module 81 generates controller signal relationships 82, which may be stored by the mapping module 80 in association with the type and/or model of the two-handed controller 34. At step 158, the user 22 may now engage in discovery activity via the electronic discovery platform 14 using the configured two-handed controller 34.

At some point in time, however, the user 22 may wish to reconfigure one or more of the controller signal relationships 82 associated with the two-handed controller 34. Accordingly, at step 160, the user 22 may submit a request to reconfigure the controller signal relationships 82 for the two-handed controller 34. At step 162, the configuration module 81 provides a controller reconfiguration GUI on the display device 32, which allows the user 22 to reconfigure the existing set of controller signal relationships 82 for the two-handed controller 34. For example, the controller reconfiguration GUI may be identical or similar to the controller configuration GUI discussed above with reference to step 152.

At step 164, the user 22 may generate and/or communicate reconfiguration instructions to configuration module 81 via the controller reconfiguration GUI, such as by making selections using the two-handed controller 34 or another input device, such as, for example, a mouse and/or keyboard. At step 166, configuration module 81 reconfigures, or changes, one or more controller signal relationships 82 and stores the changes in the mapping module 80. At step 168, the user 22 may again engage in discovery activity via the electronic discovery platform 14 using the reconfigured two-handed controller 34.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the present teachings have been described in detail with respect to various exemplary embodiments thereof, it should not be considered limited to such, as numerous modifications are possible without departing from the broad scope of the appended claims.

I claim:

1. An apparatus for performing electronic discovery related to a legal or investigative proceeding, comprising:
   a two-handed controller comprising a plurality of user inputs,
   wherein the two-handed controller is configured to logically couple to at least one electronic discovery platform to facilitate processing of electronic data when performing electronic discovery related to a legal or investigative proceeding, and
   wherein, upon actuation, each of the plurality of user inputs and various combinations thereof produce a respective signal that, when received at a computer comprising a processor, is associated with a discovery command used by the at least one electronic discovery platform.

2. The apparatus of claim 1, wherein the two-handed controller is a handheld video game controller.

3. The apparatus of claim 2, wherein the two-handed controller is a game pad.

4. The apparatus of claim 1, wherein the actuation of each of the plurality of user inputs and various combinations thereof that produce the one or more respective signals includes at least one of:
   a depression of at least one button;
   a movement of at least one joystick;
   a substantially simultaneous movement of the at least one joystick and depression of the at least one button;
   a movement of at least one arrow key; and
   a substantially simultaneous movement of the at least one arrow key and depression of the at least one button.

5. The apparatus of claim 1, wherein at least one of the plurality of user inputs is associated with a discovery command to initiate execution of electronic discovery software supported by the at least one electronic discovery platform.

6. The apparatus of claim 1, wherein at least one of the plurality of user inputs is associated with a discovery command to open a menu of options within electronic discovery software supported by the at least one electronic discovery platform.

7. The apparatus of claim 1, wherein at least one of the plurality of user inputs is associated with a discovery command related to navigation of a cursor or for selecting with a cursor.

8. The apparatus of claim 1, wherein at least one of the plurality of user inputs is associated with a discovery command to open a previous or next document.

9. The apparatus of claim 1, wherein at least one of the plurality of user inputs is associated with a discovery command to move to a different page within a file or document.

10. The apparatus of claim 1, wherein at least one of the plurality of user inputs is associated with a discovery command to save a document or file.

11. The apparatus of claim 1, wherein at least one of the plurality of user inputs is associated with a discovery command to open a print dialog box.

12. The apparatus of claim 1, wherein at least one of the plurality of user inputs is associated with a discovery command to select all documents obtained from a query.

13. The apparatus of claim 1, wherein at least one of the plurality of user inputs is associated with a discovery command to redact portions from a document or file.

14. The apparatus of claim 1, wherein the plurality of user inputs comprise buttons, keys, and/or joysticks.

15. A method for using a two-handed controller for electronic discovery relating to a legal or investigative proceeding, comprising:
   actuating at least one of a plurality of user inputs on the two-handed controller; and
   upon the actuating, producing a respective signal for each of the plurality of user inputs, wherein when received at a computer comprising a processor, the respective signals are associated with a respective discovery command used by an electronic discovery platform to facilitate processing of electronic data when performing electronic discovery related to a legal or investigative proceeding.

16. The method of claim 15, wherein actuating at least one of a plurality of user inputs comprises actuating at least one of a plurality of buttons, keys, and/or joysticks on a handheld video game controller.

17. The method of claim 15, wherein actuating at least one of a plurality of user inputs includes at least one of:
   depressing at least one button;
   moving at least one joystick;
   moving the at least one joystick and depressing the at least one button substantially simultaneously;
   moving at least one arrow key; and
   moving at least one arrow key and depressing the at least one button substantially simultaneously.

* * * * *